Patented Nov. 14, 1933

1,934,795

UNITED STATES PATENT OFFICE 1,934,795

CATALYST AND METHOD OF MAKING IT

Joseph C. W. Frazer, Baltimore, Md.

No Drawing. Application August 12, 1929
Serial No. 385,452

6 Claims. (Cl. 23—234)

This invention relates to oxidizing catalysts, and especially to such catalysts for use at elevated temperatures. While the invention is unlimited to any particular use, it has been found to be especially advantageous in the treatment of the exhaust gases from internal combustion engines for eliminating their poisonous and noxious constituents, and is accordingly so described herein.

Many catalysts have been suggested for oxidation of the carbon monoxide contained in internal combustion engine exhaust gases. However, these gases also contain other combustible substances, such as unburned gasolene and oil, and products resulting from their decomposition or partial combustion, and because it is not possible to preferentially oxidize only the carbon monoxide, combustion of such gases liberates a very large amount of heat. The known oxidizing catalysts are not adapted for such use, for various reasons known to the art. For example, many of the low temperature carbon monoxide catalysts are highly sensitive to water, or are poisoned by other materials, and some of them are so expensive, or are so difficult to prepare and maintain in a highly active condition, as to preclude their extensive use. Also, carbon monoxide catalysts hitherto known either decrease in activity, or cease to function, upon continuous exposure to the high temperatures resulting from catalytic oxidation of internal combustion exhaust gases, or, what is equally serious, they commonly lose their activity upon being repeatedly exposed to such temperatures. Up to the present time, no catalyst which is satisfactory for oxidation of gases of the type referred to has been developed.

An object of the present invention is to provide an oxidizing catalyst which is adapted for use at elevated temperatures, particularly for oxidation of internal combustion exhaust gases, which is cheap and easily prepared, highly active, capable of functioning in the presence of water vapor, and which is highly efficient over long periods of time when used either continuously or intermittently.

A particular object is to provide a supported catalyst of the type referred to which is adapted to dissipate the heat formed in the use of the catalyst, and to resist the effect of the heat generated and localized in the catalytic zone.

Another special object is to provide a method of making catalysts of the foregoing types which is simple, readily performed, requires no expensive or complicated apparatus, and which provides such catalysts at low cost.

The invention is predicated upon my discovery that oxygen compounds of chromium and a metal in proportions preferably corresponding substantially to a chromite, form highly active oxidizing catalysts for use at elevated temperatures, and which when supported by a heat resistant metal are especially suited for catalytic oxidation (combustion) of the combustible constituents of internal combustion engine exhaust gases.

The invention is further predicated upon my discovery that such chromite catalysts may be prepared simply and readily by reduction of a metal chromate, and that a particularly satisfactory catalyst may be prepared by wetting a suitable support with a solution of a chromate prepared by solution of an oxide or hydroxide of a metal in chromic acid, and heating the wetted support to form a chromite.

The catalysts provided in accordance with the invention comprise combinations of an oxide of chromium with a metallic oxide which is sufficiently basic to form a chromite, in proportions corresponding to a chromite, and, for reasons hereinafter set forth, it is preferred to refer to the catalysts as chromites. The cation of the chromite may be any metal whose oxide or hydroxide is sufficiently basic, and preferably it comprises a metal of the sixth, seventh or eighth groups of the periodic system, the most suitable catalysts being iron chromites. In the event that the chromite cation is capable of existing in several stages of oxidation, it is preferably present in its highest stage, and so far as I am now aware, the most suitable catalysts of the type contemplated are artificially prepared products.

The characteristics of the catalysts may best be understood by consideration of the preferred method of preparing them, and, because high temperature catalysts are generally supported, the process will be described with reference to their production in such form, although it will be understood that they are not necessarily limited to use in a supported condition.

In the preferred practice of the invention, in which the chromites are produced by reduction of a chromate, a suitable carrier is coated with a metallic chromate, preferably by wetting the support with a solution containing the chromate, and the catalyst is formed by drying and heating the wetted support.

Any suitable catalyst-supporting material may be used, depending upon the use to which the catalyst is to be put. If the catalyst is to be used for effecting complete combustion of the combustible constituents of internal combustion engine exhaust gases, the carrier must be thermally stable. That is, it must melt appreciably above the temperatures which normally prevail in the reaction zone, it must resist the severe oxidizing conditions which are inherently present, and it must not adversely react or combine with the catalyst. Metals are most suitable for this purpose, because they can be readily fabricated into desired forms, they are adapted to transfer heat away from the catalytic zone, and they retain their form in use. Although many metals and alloys are unsuitable for this purpose, because they are not thermally stable, or are expensive, or for other reasons, I have found that suitable supports may be formed from the copper-nickel alloy termed Monel metal, or from other metals, such as the high chromium rustless irons and the like. The supports are preferably used in the form of grids, screens or other foraminous structures, which have extended surfaces for receiving the catalyst.

The invention includes a particularly suitable method for the preparation of the chromate solutions which are preferably used in the preparation of the catalysts. This feature of the invention is based upon my discovery that the oxides or hydroxides of the metals contemplated by the invention dissolve in chromic acid solution and produce solutions from which the chromite catalysts may be quickly and easily prepared. Because metal oxides are usually less readily soluble than the corresponding hydroxides, it is, in most cases, desirable to use the latter, and where the hydroxides are insoluble in water, it is preferred to use them in a freshly precipitated condition. The most satisfactory results are obtained when the hydroxide (or oxide) and chromic acid are reacted in proportions adapted to form a chromate of the metal used.

In the production of supported catalysts, the support is coated with a chromate, and is then heated to convert the chromate to chromite. For example, the support may be dipped in the solution just described, and after draining off the excess solution, the wetted support is then dried, as by heating to about 110° C., to form a coating of the material contained in the solution. It may then be prepared for use by heating, for example, to 300 to 400° C., or the conversion may be postponed until the catalyst is to be used, the first heating in use causing the desired transformation. The same result may, of course, be obtained by heating the wetted support directly at a converting temperature thus eliminating the drying step as such.

As a specific example of the invention there may be described the preparation of an iron chromite catalyst, which forms the preferred embodiment. In accordance with the preferred practice, there is first formed a solution of an iron chromate by solution of iron hydroxide in chromic acid solution. For example, 404 grams of hydrated ferric nitrate [Fe(NO$_3$)$_3$.9H$_2$O] dissolved in about three liters of water is precipitated with half-strength ammonia, and to the resultant suspension of ferric hydroxide there is added sufficient chromic oxide, preferably in concentrated aqueous solution, to form a ferric chromate. In the case of iron chromite catalysts it is preferred to form the acid chromate, Fe(HCrO$_4$)$_3$, and accordingly a solution of 300 grams of chromic oxide in sufficient water to dissolve it is added to the iron hydroxide suspension. When the chromic acid is added, the ferric hydroxide is flocculated, but upon vigorous stirring it rapidly dissolves, forming a deep red solution.

The support, for example a Monel metal screen, after being thoroughly freed from grease, as by heating to a bright red heat, is dipped into the iron chromate solution, and after the excess solution has drained off, it is dried and heated, or it may be dried and then put into use. Tests of an iron chromite catalyst prepared in this manner have shown that in the presence of oxygen the catalyst is capable of causing complete combustion of the combustible constituents of internal combustion engine exhaust gases, at temperatures ranging from about 400 to 1130° C., and that it is capable of complete activity within this range of temperature for long periods of time. Its activity is apparently not affected by long-continued exposure at such temperatures, or by intermittent use accompanied by intermediate cooling to atmospheric temperature.

Service tests such as those just referred to have shown it to be characteristic also of the catalysts provided by this invention that the chromite coatings formed by heating the wetted supports adhere tenaciously to the support. This ability to form thin films which adhere and are active at elevated temperatures permits the use of metallic supports, with their beneficial thermal conductivity and desirable forms, and it also provides sturdy catalysts whose mechanical integrity is proof against gas currents and other mechanical disturbances.

In actual tests of an iron chromite catalyst, all of the exhaust gases of a standard make six cylinder automobile were passed through Monel metal grids prepared in the manner described, oxygen in the form of preheated air in amounts sufficient to provide an excess over that theoretically needed for complete combustion being supplied to the catalyst. Not only was all of the carbon monoxide converted to dioxide, but the treated gases were wholly free from combustible constituents, and they were colorless and odorless. After the automobile had been driven more than 1500 miles, the catalyst was still functioning perfectly, and gave no evidence whatever of decreased activity.

The catalysts have been referred to as chromites, and the substances from which they are preferably formed as chromates. The belief upon which this terminology is based rests partly upon the fact that in the preferred embodiment the catalyst-forming material is made in a manner adapted to form a chromate, that is, by solution of a metal hydroxide in chromic acid solution, and also upon the known fact that chromates are reduced to chromites. For example, in the example just given, the iron hydroxide is dissolved by the chromic acid, and the proportions used are such that an iron chromate is probably formed which corresponds to the composition represented by the formula Fe(HCrO$_4$)$_3$. Upon heating, this chromate breaks down to form a chromite which may be represented either as Fe(CrO.O)$_3$, or by the empirical formula Fe$_2$O$_3$.3Cr$_2$O$_3$. Also, in producing these iron chromite catalysts, the coating changes color when first heated, which indicates a possible change of composition.

Furthermore, my tests have shown, that when the proportions of materials used vary materially from those required to form a chromate, and ultimately a chromite, the resultant material is not as good a catalyst as when the product conforms substantially to chromite proportions. In addition, tests of mechanical mixtures of the oxides constituting the supposed chromite in proportions corresponding thereto have shown them to be markedly inferior to the catalysts prepared in a manner adapted to produce a chromite. In view of all of these facts, it appears probable that the catalyst is actually a chemical combination of a metal oxide and chromium oxide, and probably a chromite, and in the specification and claims it is so referred to. It will be understood, however, that the catalyst may be other than a chromite, and that the material from which it is formed may not be a chromate, but that these terms refer to products of the type described and claimed, whatever be their actual manner of association.

In further explanation of these matters, tests have shown that the chromite contains some small proportion of chromium compounds which is soluble in dilute acids, and which is probably unconverted chromate. In the procedure described it will be observed that the chromites are not washed before being used, i. e. when used they contain the residual unconverted material referred to, and, in further explanation of the invention, this residual material appears to be essential to the oxidizing activity of the catalyst. Thus, if it is removed by leaching the chromite with dilute acid the efficiency of the catalyst is seriously impaired. For this reason they are not washed prior to use. Reheating such acid leached chromite does not appear to restore its activity fully.

Although the invention has been explained by reference to iron chromites, other metal chromites may be used as high temperature oxidizing catalysts, such as chromites of copper, lead, zinc, and the like, or chromium chromite. These may be, and preferably are, made by the solution procedure explained previously. For example, to form a zinc chromite catalyst, one gram molecular weight of zinc nitrate dissolved in water is precipitated, and to the zinc hydroxide suspension there is added 200 grams of chromic oxide dissolved in a little water. In all cases the materials may be proportioned to give the normal chromate, but the acid chromate is usually to be preferred. Supported catalysts made from this zinc chromate solution in the manner used in preparing the iron chromate catalysts, although not as satisfactory in all respects for combustion of internal combustion engine exhaust gases as an iron chromite, may be used successfully as oxidizing catalysts at elevated temperatures.

The ease of production, cheapness, ability to remain active at high temperatures for long periods of time, or to function efficiently after repeated heating and cooling, and other characteristics of the catalysts provided by the invention adapts them particularly for extensive use in the treatment of internal combustion engine exhaust gases. However, they may be used to effect other catalytic oxidations at elevated temperatures, for example to convert sulfur dioxide to sulfur trioxide, and in other cases where a high temperature catalyst is needed.

According to the provisions of the patent statutes, I have explained the principle and mode of operation of my invention, and have given specific examples of how it may be practiced. However, I desire to have it understood that, within the scope of the appended claims, the invention may be practiced otherwise than as specifically described.

I claim:

1. A method of preparing a supported oxidizing catalyst comprising mixing ferric hydroxide with a solution of chromic acid to form a solution of iron chromate, wetting a metallic catalyst support with said chromate solution, and heating the wetted support to convert its retained chromate to an iron chromite coating which is strongly adherent and highly active at high temperatures.

2. A method of preparing a supported oxidizing catalyst comprising forming a solution of one mol of precipitated ferric hydroxide and three mols of chromic oxide, wetting a metallic catalyst support with said solution, and heating the wetted support to convert the retained solution into an iron chromite coating which is strongly adherent and highly active at high temperatures.

3. An oxidizing catalyst capable of continuous high activity at elevated temperatures, comprising an iron chromite formed by heating a solution made by dissolving ferric hydroxide in chromic acid in proportions corresponding to iron chromate.

4. An oxidizing catalyst capable of continuous high catalytic activity at elevated temperatures, comprising a heat-resistant metallic support having a thin strongly adherent coating of an iron chromite formed by wetting said support with a solution of iron chromate prepared by reacting chromic acid solution with precipitated ferric hydroxide and heating the wetted support to convert its retained chromate to chromite.

5. The method of preparing a supported oxidizing catalyst comprising mixing a solution of chromic acid with a hydroxide of a metal whose chromate is capable of being converted to a catalytically active chromite, the proportions of chromic acid and said hydroxide being adapted to form a solution of chromate of said metal, wetting a catalyst support with said chromate solution, and heating the wetted support to convert its retained chromate to a coating of said chromite which is strongly adherent and which at high temperatures is capable of oxidizing carbon monoxide in gas atmospheres at high efficiency.

6. A method of preparing a supported oxidizing catalyst comprising mixing a solution of chromic acid with a precipitated hydroxide of a metal of the sixth, seventh or eighth groups whose chromate is capable of being converted to a catalytically active chromite, the proportions of said acid and hydroxide being adapted to form chromate of said metal, wetting a catalyst support with said chromate solution, and heating the wetted support to convert its retained chromate to a coating of said chromite which is strongly adherent and which at elevated temperatures is capable of oxidizing carbon monoxide in gas mixtures at high efficiency.

JOSEPH C. W. FRAZER.